3,423,240
PICKLING PROCESS

Thomas H. Oster, Dearborn, Mich., assignor to Ford Motor Company, Dearborn, Mich., a corporation of Delaware
No Drawing. Filed Aug. 19, 1965, Ser. No. 481,068
U.S. Cl. 134—3                        11 Claims
Int. Cl. C23g 1/08

ABSTRACT OF THE DISCLOSURE

A process of pickling carbon sheet steel in a hydrochloric acid bath comprising adding sodium chloride and a sulphur containing substance to the pickling liquor to produce sodium sulphate and hydrogen chloride, including employing a thermal decomposing step and using waste sulphuric acid pickling liquor as a source of said sulphur containing substance.

---

This invention relates to a process for pickling sheet carbon steel in acid baths to prepare the surface of the steel for further finishing operations such as painting. This invention is particularly concerned with a process in which the cost of acids for such a process is lowered and the necessity of disposing a sulphuric acid and ferrous sulphate eliminated.

Carbon steel products have long been pickled in sulphuric acid. This process and the difficulties of disposing of the spent sulphuric acid pickling liquors are too well known in the art to require further elaboration. The art has recently turned to hydrochloric acid as a pickling medium to avoid certain of the difficulties inherent in the use of the much cheaper sulphuric acid. The ferrous chloride solution in hydrochloric acid produced in the hydrochloric acid pickling process is readily decomposed thermally with the almost complete recovery of all of the chloride ion and reusable hydrochloric acid. This feature of the use of hydrochloric acid enables hydrochloric acid to compete with sulphuric acid despite its higher cost.

The subject of hydrochloric acid pickling of steel and the recovery of hydrochloric acid from the spent pickling liquors is discussed in detail in articles by Perkins et al. and Poole extending from page 156 to page 163 of the April 1965 issue of Iron and Steel Engineer. This invention is concerned with hydrochloric acid pickling as taught by Perkins et al. and Poole and more specifically with a modification of the hydrochloric acid recovery systems shown by these authors. The teachings of these authors is incorporated into this specification by reference.

The overall economy of pickling operations can be improved by a modification of the usual hydrochloric acid recovery system by a provision for the addition of the extra chloride ion necessary in the form of sodium chloride to compensate for losses in the system. The addition of sodium chloride to the pickling liquor from a hydrochloric acid pickling tank accompanied by at least a stoichiometric amount of a sulphur containing substance capable of reacting with the sodium chloride to produce hydrogen chloride and sodium sulphate will result in an almost quantitative conversion of the sodium chloride to hydrogen chloride. In steel plants operating both hydrochloric acid pickling lines and sulphuric acid pickling lines, the waste sulphuric acid pickling liquor is an ideal source of sulphur containing material. In situations where sulphuric acid pickle liquor is not readily available, recourse can be had to other economical sources of reactive sulphur. Among such are elemental sulphur, petroleum refinery sludge, sulphuric acid and pyrites. Any of these substances will react with oxygen and water vapor and sodium chloride to produce sodium sulphate and hydrogen chloride. The conventional hydrochloric acid recovery system involves a reaction chamber heated by direct flame. It is of course necessary to operate these flames so as to permit the presence of sufficient oxygen beyond that required for the flame to react with the sodium chloride and sulphur compound. This necessary oxygen is referred to as excess oxygen.

It is preferred, although not absolutely necessary, to operate the thermal decomposition step producing hydrogen chloride at a temperature sufficiently high to permit the non-gaseous products to be withdrawn in a molten state. In the case of the use of a stoichiometric quantity of sodium chloride, the non-gaseous products are iron oxide and sodium sulphate. In this event the process should be operated to discharge a suspension of iron oxide in molten sodium sulphate. It will often be found to be advantageous to add an excess of sodium chloride so that the sodium chloride not employed in the reaction will be available to reduce the melting point of the sodium sulphate. In such event the non-gaseous product discharged will be a suspension of iron oxide in a low melting mixture of sodium chloride and sodium sulphate. The sodium chloride may be added as the usual dry salt or as a brine, as dictated by the economies of the locality.

I claim as my invention:

1. The process of pickling carbon sheet steel comprising exposing carbon sheet steel to a bath of hydrochloric acid and to a bath of sulphuric acid whereby a dilute solution of ferrous chloride in hydrochloric acid and a dilute solution of ferrous sulphate in sulfuric acid is produced, thermally decomposing the solution of ferrous chloride in hydrochloric acid to produce iron oxide and a gaseous stream including steam and hydrogen chloride, adding sodium chloride to the solution of ferrous sulphate in sulfuric acid, thermally decomposing the mixture of sodium chloride, sulfuric acid and ferrous sulphate in the presence of excess air to produce iron oxide, sodium sulphate and a gaseous stream including steam and hydrogen chloride, and at least partially condensing the mixtures of steam and hydrogen chloride to produce a feed hydrochloric acid of the desired concentration.

2. The process of pickling carbon sheet steel comprising exposing carbon sheet steel to a bath of hydrochloric acid and to a bath of sulphuric acid whereby a dilute solution of ferrous chloride in hydrochloric acid and a dilute solution of ferrous sulphate in sulfuric acid is produced, thermally decomposing the solution of ferrous chloride in hydrochloric acid to produce iron oxide and a gaseous stream including steam and hydrogen chloride, adding sodium chloride to the solution of ferrous sulphate in sulfuric acid, thermally decomposing the mixture of sodium chloride, sulfuric acid and ferrous sulphate in the presence of excess air to produce iron oxide, sodium sulphate and a gaseous stream including steam and hydrogen chloride, mixing the two gaseous streams containing hydrogen chloride and steam and at least partially condensing the mixtures of steam and hydrogen chloride to produce a feed hydrochloric acid of the desired concentration.

3. The process of pickling carbon sheet steel comprising exposing carbon sheet steel to a bath of hydrochloric acid and to a bath of sulphuric acid whereby a dilute solution of ferrous chloride in hydrochloric acid and a dilute solution of ferrous sulphate in sulfuric acid is produced, combining the solution of ferrous chloride and ferrous sulphate and adding sodium chloride to the combined solutions, thermally decomposing the mixture of ferrous chloride, ferrous sulphate, hydrochloric acid, sulphuric acid and sodium chloride in the presence of excess oxygen to produce as non-gaseous products iron oxide and sodium sulphate and a gaseous stream including hydrogen chloride and steam, and at least partially condensing this gaseous stream to produce a feed hydrochloric acid of the desired concentration.

4. The process of pickling carbon sheet steel comprising exposing carbon sheet steel to a bath of hydrochloric acid and to a bath of sulphuric acid whereby a dilute solution of ferrous chloride in hydrochloric acid and a dilute solution of ferrous sulphate in sulphuric acid is produced, combining the solution of ferrous chloride and ferrous sulphate and adding to the combined solutions a quantity of sodium chloride stoichiometrically equavilent to the ferrous sulphate, and sulphuric acid present, thermally decomposing the mixture of ferrous chloride, ferrous sulphate, hydrochloric acid, sulphuric acid and sodium chloride in the presence of excess oxygen to produce as non-gaseous products iron oxide and sodium sulphate and a gaseous stream including hydrogen chloride and steam, and at least partially condensing this gaseous stream to produce a feed hydrochloric acid of the desired concentration.

5. The process of pickling carbon sheet steel comprising exposing carbon sheet steel to a bath of hydrochloric acid and to a bath of sulphuric acid whereby a dilute solution of ferrous chloride in hydrochloric acid and a dilute solution of ferrous sulphate in sulphuric acid is produced, combining the solution of ferrous chloride and ferrous sulphate and adding to the combined solutions a quantity of sodium chloride stoichiometrically equivalent to the ferrous sulphate and sulphuric acid present, thermally decomposing the mixture of ferrous chloride, ferrous sulphate, hydrochloric acid, sulphuric acid and sodium chloride in the presence of excess oxygen to produce as non-gaseous products iron oxide and sodium sulphate and a gaseous stream including hydrogen chloride and steam, tapping off the non-gaseous products of the reaction as a suspension of iron oxide in molten sodium sulphate, and at least partially condensing this gaseous stream to produce a feed hydrochloric acid of the desired concentration.

6. The process of pickling carbon sheet steel comprising exposing carbon sheet steel to a bath of hydrochloric acid and to a bath of sulphuric acid whereby a dilute solution of ferrous chloride in hydrochloric acid and a dilute solution of ferrous sulphate in sulphuric acid is produced, combining the solution of ferrous chloride and ferrous sulphate and adding to the combined solutions a quantity of sodium chloride substantially in excess of the stoichiometric requirements of the ferrous sulphate and sulphuric acid present, thermally decomposing the mixture of ferrous chloride, ferrous sulphate, hydrochloric acid, sulphuric acid and sodium chloride in the presence of excess oxygen to produce as non-gaseous products iron oxide, sodium sulphate and sodium chloride, and a gaseous stream including hydrogen chloride and steam, and at least partially condensing this gaseous stream to produce a feed hydrochloric acid of the desired concentration, the stoichiometric excess of sodium chloride being sufficient to substantially lower the melting point of the sodium sulphate produced in the reaction.

7. The process of pickling carbon sheet steel comprising exposing carbon sheet steel to a bath of hydrochloric acid and to a bath of sulphuric acid whereby a dilute solution of ferrous chloride in hydrochloric acid and a dilute solution of ferrous sulphate in sulphuric acid is produced, combining the solution of ferrous chloride and ferrous sulphate and adding to the combined solutions a quantity of sodium chloride substantially in excess of the stoichiometric requirements of the ferrous sulphate and sulphuric acid present, thermally decomposing the mixture of ferrous chloride, ferrous sulphate, hydrochloric acid, sulphuric acid and sodium chloride in the presence of excess oxygen to produce as non-gaseous products iron oxide, sodium sulphate and sodium chloride, and a gaseous stream including hydrogen chloride and steam, tapping off the non-gaseous products of the reaction as a suspension of iron oxide in a molten mixture of sodium chloride and sodium sulphate, said mixture melting at a much lower temperature than either sodium chloride of sodium sulphate.

8. The process of pickling carbon sheet steel comprising exposing carbon sheet steel to a bath of hydrochloric acid essentially free of nonferrous metals whereby a dilute solution of ferrous chloride in hydrochloric acid is produced, adding to the dilute solution of ferrous chloride in hydrochloric acid sodium chloride, a sulphur containing substance capable of reacting with sodium chloride and oxygen to produce sodium sulphate and hydrogen chloride, thermally decomposing the mixture of hydrochloric acid, ferrous chloride, sodium chloride and sulphur containing substance in the presence of excess oxygen to produce non-gaseous products iron oxide and sodium sulphate, and a gaseous stream including hydrogen chloride and steam, and at least partially condensing this gaseous stream to produce a feed hydrochloric acid feed of the desired concentration.

9. The process of pickling carbon sheet steel comprising exposing carbon sheet steel to a bath of hydrochloric acid essentially free of nonferrous metals whereby a dilute solution of ferrous chloride in hydrochloric acid is produced, adding to the dilute solution of ferrous chloride in hydrochloric acid sodium chloride, a sulphur containing substance capable of reacting with sodium chloride and oxygen to produce sodium sulphate and hydrogen chloride, thermally decomposing the mixture of hydrochloric acid, ferrous chloride, sodium chloride and sulphur containing substance in the presence of excess oxygen to produce non-gaseous products iron oxide and sodium sulphate, and a gaseous stream including hydrogen chloride and steam, tapping off the non-gaseous products of the reaction as a suspension of iron oxide in molten sodium sulphate.

10. The process of pickling carbon steel sheet comprising exposing the carbon steel sheet to a bath of hydrochloric acid essentially free of nonferrous metals whereby a dilute solution of ferrous chloride in hydrochloric acid is produced, adding to the dilute solution of ferrous chloride in hydrochloric acid sodium chloride and less than a stoichiometric amount of a sulphur containing substance capable of reacting with sodium chloride and oxygen to produce sodium sulphate and hydrogen chloride, thermally decomposing the mixture of hydrochloric acid, ferrous chloride, sodium chloride and sulphur containing substances in the presence of excess oxygen to produce as non-gaseous products iron oxide, sodium sulphate and sodium chloride, and a gaseous stream including hydrogen chloride and steam, and at least partially condensing this gaseous stream to produce a feed hydrochloric acid of the desired concentration, the stoichiometric excess of sodium chloride being sufficient to substantially lower the melting point of the sodium sulphate produced in the reaction.

11. The process of pickling carbon steel sheet comprising exposing the carbon steel sheet to a bath of hydrochloric acid essentially free of nonferrous metals whereby a dilute solution of ferrous chloride in hydrochloric acid is produced, adding to the dilute solution of ferrous chloride in hydrochloric acid sodium chloride and less than a stoichiometric amount of a sulphur containing substance capable of reacting with sodium chloride and oxygen to produce sodium sulphate and hydrogen chloride, thermally decompsing the mixture of hydrochloric acid, ferrous chloride, sodium chloride and sulphur containing substance in the presence of excess oxygen to produce as non-gaseous products iron oxide, sodium sulphate and sodium chloride, and a gaseous stream including hydrogen chloride and steam, tapping off the non-gaseous products of the reaction as a suspension of iron oxide in a molten mixture of sodium chloride and sodium sulphate, said mixture melting at a much lower temperature than either sodium chloride or sodium sulphate.

References Cited

UNITED STATES PATENTS

| | | | |
|---|---|---|---|
| 1,225,956 | 5/1917 | Hoffman | 134—13 |
| 2,428,221 | 9/1947 | Hudson | 134—12 X |
| 2,831,814 | 4/1958 | Chester et al. | 134—28 X |
| 2,877,146 | 3/1959 | Francis | 134—28 X |
| 3,310,435 | 3/1967 | Robinson et al. | 134—10 X |

OTHER REFERENCES

Perkins et al.: "Hydrochloric Acid Pickling and Acid Regeneration," Iron and Steel Engineer, April 1965, pp. 156–159.

Poole: "Republic's Continuous Reclamation Hydrochloric Acid Pickling at Gadsden, Ala.," Iron and Steel Engineer, April 1965, pp. 160–163.

HARRY B. THORNTON, *Primary Examiner.*

TIM R. MILES, *Assistant Examiner.*

U.S. Cl. X.R.

134—10, 41